Nov. 12, 1935.　　　　C. D. ELLINGSTON　　　　2,020,772
AIRCRAFT APPLIANCE
Filed Oct. 2, 1934　　　　2 Sheets-Sheet 1
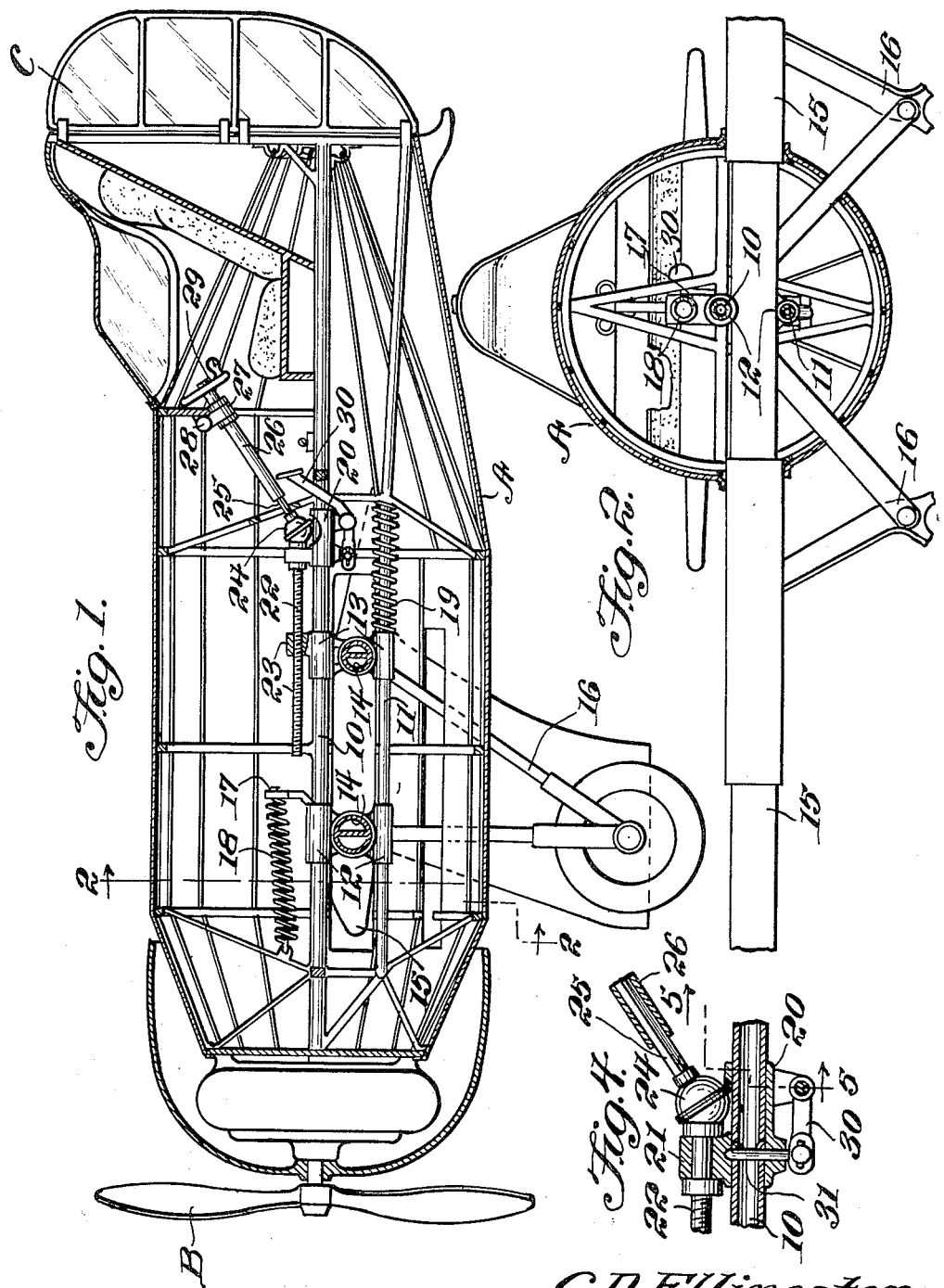

Nov. 12, 1935.                C. D. ELLINGSTON                2,020,772
                              AIRCRAFT APPLIANCE
                              Filed Oct. 2, 1934              2 Sheets-Sheet 2
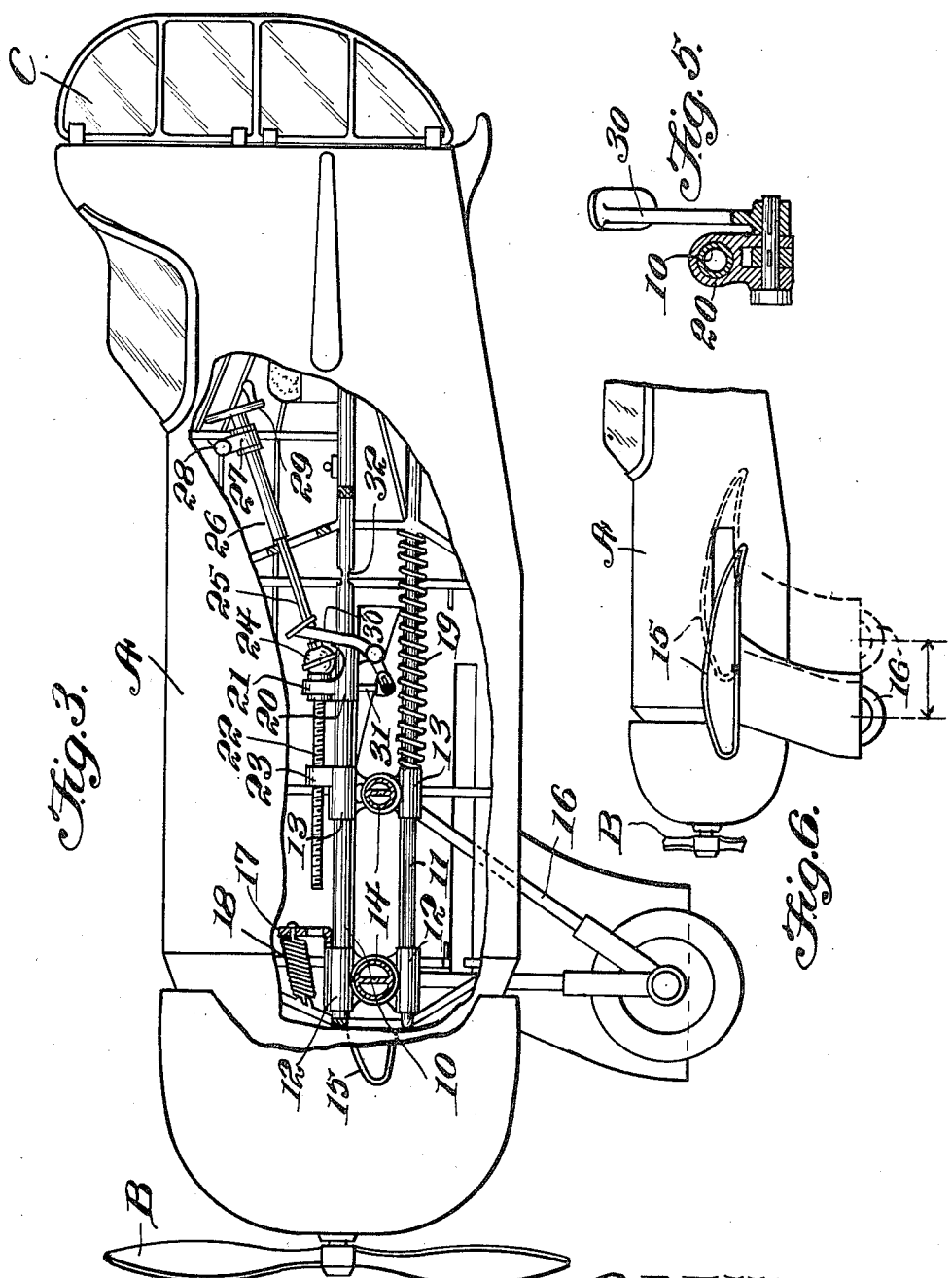

Patented Nov. 12, 1935

2,020,772

UNITED STATES PATENT OFFICE 2,020,772

AIRCRAFT APPLIANCE

Cornwallis D. Ellingston, Great Falls, Mont.

Application October 2, 1934, Serial No. 746,601

4 Claims. (Cl. 244—12)

The invention relates to an aircraft appliance and more particularly to a new, simplified, positive and controlled horizontal shifting of the wings and landing gear for the purposes of stabilizing the flight of a plane and safety in landing and affording new and additional shock absorbing features in the landing gear.

In the present-day type of airplane, the wings are stationary and the only method of stabilizing the plane in flight is by a device operating upon the tail surface and such a device lowers the speed of the plane in flight, creates a drag and is not positive, and not controlled, and complicated in mechanism. The present landing gears, whether affixed to the wing or not, are fixed and cannot be moved horizontally and do not furnish protection against "nosing over", they being possessed only of vertical shock absorbing features.

To obviate these disadvantages it is the aim of the present invention to so construct the wings and the landing gear that they can be moved forward and backward at the will of a pilot, in order to keep the plane balanced and stabilized at all times and at the control of the pilot to permit the wings and landing gears to be quickly and instantaneously shot forward far beyond the longitudinal balance point, leaving the larger portion of the airplane's weight to be supported by the tail skid, thus affording in addition to the stabilizing feature, safety in landing and permitting positive brakes to be put on wheels and furnishing horizontal, as well as vertical shock absorbing features.

A further aim of the present invention is the provision of an appliance of this character, wherein the construction and the assembly in an airplane are of novel form for positive control by a pilot, with resultant and more effective operation of the airplane.

A further aim of the present invention is the provision of an appliance of this character which is comparatively simple in construction, thoroughly reliable and efficacious in its purposes, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a vertical longitudinal sectional view through an airplane showing the appliance constructed in accordance with the invention applied thereto.

Figure 2 is a fragmentary vertical transverse sectional view on the line 2—2 of Figure 1 looking in the direction of the arrows.

Figure 3 is a side elevation partly broken away showing the appliance in an adjusted position or differently positioned than that in Figure 1.

Figure 4 is an enlarged fragmentary detail vertical longitudinal sectional view through the appliance.

Figure 5 is a sectional view on the line 5—5 of Figure 4.

Figure 6 is a fragmentary side elevation showing the limits of backward and forward movements of the wings and landing gear under adjustment of the appliance, the forward position being shown by full lines and the rearward position by dotted lines.

Similar reference characters indicate corresponding parts throughout the several views in the drawings.

Referring to the drawings in detail, A designates generally the body of an airplane which may be of any standard construction and the plane in this instance is of the monoplane type, although it may be of other style, having at its nose end the propeller B and at the tail end the tail rudder C.

Located within the body A of the airplane and at the longitudinal center thereof is a tubular guide 10, while spaced below the same and parallel therewith is a supplemental guide 11, these being fitted with spaced fore and aft sleeve-like slides 12 and 13, having joined therewith the transverse spars 14 of the main monoplane wing 15 which projects laterally beyond opposite sides of the body A, as is usual. The opposite sides of the body A have formed therein suitable slots for clearance for the spars 14 to permit longitudinal displacement of the wings 15 relative to the body A of the plane.

Joined with the slides 12 and 13 is the wheeled landing gear 16 which may be of folding or other type and is displaceable with the wing 15 of the plane in a longitudinal direction. Built upon the slide 12 is a hanger 17 for a shock cord or spring 18, the same being disposed fore of the hanger and connected with the body A of the plane in any suitable manner, while connected with the slide 13 is a shock cord or spring 19, these cords or springs 18 and 19 being for the purpose of advancing the wing 15 with the landing gear 16 longitudinally and stabilizing the plane in flight and when landing in a short field or making any dangerous landing where there is liability of the plane "nosing over".

Rearwardly of the slide 13 and carried by the guide 10 is a movable carriage 20 supporting a bearing 21 in which is swiveled a feed screw 22, the same being threaded in a coupling 23 on the slide 13 so that by the turning of the screw 22 the relative position of the slide 13 with the slide 12 and the carriage 20 may be changed. The feed screw 22 carries at its rear end a universal joint 24 connecting with it a stem 25 telescoped within a turning column 26, the stem and column being so connected as to rotate in unison for permitting telescopical movement of the stem 25 within the column. This column 26 is rotatably supported within a bracket 27 pivoted at 28 to a fixed part of the body, while the uppermost end of the column 26 carries a hand wheel 29 so that the column 26 can be rotated in the bracket 27 and in this manner the screw 22 will be operated for changing the position of the wing 15 and the landing gear 16 or the adjustment thereof for stabilizing purposes.

The carriage 20 has pivotally mounted thereon a foot pedal 30 controlling a latching pin 31 engageable in a keeper notch 32 in the guide 10 and this pin, when engaged with the notch, will hold or latch the carriage 20 at the limit of its rearmost movement, the carriage being moved to this position by the screw 22 under actuation of the hand wheel 29, as should be apparent. Normally the carriage 20 is latched with the guide 10 and the slides 12 and 13 are in the position as shown in Figure 1 of the drawings, so that the wing 15 will be located for normal flight of the plane, while in Figure 3 the said wing has been shifted forwardly to safety position for landing, the said wing being in the farthest advanced position to the front of the plane and this being brought about by releasing the carriage 20 so that the springs 18 and 19 will operate upon the slides 12 and 13 to shoot the same forwardly on the guide 10 to the position as shown in said Figure 3 of the drawings.

It should be obvious that a pilot, when operating the hand wheel 29 by positive action of the screw 22, will cause the slides 12 and 13 and the wing 15 with the landing gear 16 attached to move backward or forward as desired and thus stabilizing the plane in flight and when landing in a short field or making any dangerous landing where there is liability of the plane "nosing over". The pedal 30 can be manually operated, causing the release of the carriage and by the action of the springs 18 and 19 the wing and landing gear will be shot forward instantly so that the landing gear and wings will be far forward of the longitudinal balance point of the plane, throwing a large portion of the airplane's weight back of the landing gear and onto its tail skid, preventing the plane from "nosing over". In this adjustment the pilot may then, upon taking off, or before taking off, operate the wheel 29 to retract the appliance to its normal position, as is shown in Figure 1 of the drawings.

What is claimed is:

1. In an airplane, a wing movable fore and aft, slides movably supporting said wing, means for shooting the slides forwardly, means for locking the slides against forward shooting movement, and means for moving the slides forwardly or rearwardly when locked against shooting movement.

2. In an airplane, a wing movable fore and aft, slides movably supporting said wing, means for shooting the slides forwardly, means for locking the slides against forward shooting movement, means for moving the slides forwardly or rearwardly when locked against shooting movement, and means for controlling the last-named means manually.

3. In an airplane, a wing movable fore and aft, slides movably supporting said wing, means for shooting the slides forwardly, means for locking the slides against forward shooting movement, means for moving the slides forwardly or rearwardly when locked against shooting movement, means for controlling the last-named means manually, and a landing gear movable with the wing.

4. In an airplane, a body, a wing longitudinally movable relative to the body, slides fitted in the body and supporting the wing, a landing gear carried by the slides, a carriage movable relative to the slides, a feed screw connecting the carriage and slides, means for locking the carriage against movement, means for shooting the slides forwardly when the carriage is unlocked, and means for operating the feed screw to vary the relation of the slides with respect to the carriage when locked or unlocked.

CORNWALLIS D. ELLINGSTON.